(12) United States Patent
Inoue

(10) Patent No.: US 6,607,060 B2
(45) Date of Patent: Aug. 19, 2003

(54) CLUTCH OPERATING SYSTEM AND A HYDRAULIC MECHANISM USED IN THE SAME

(75) Inventor: Akira Inoue, Suita (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/042,200

(22) Filed: Jan. 11, 2002

(65) Prior Publication Data

US 2002/0096415 A1 Jul. 25, 2002

(30) Foreign Application Priority Data

Jan. 22, 2001 (JP) ........................................ 2001-013011

(51) Int. Cl.[7] .......................... F16D 25/08; F16D 25/12
(52) U.S. Cl. ...................... 192/83; 192/84.6; 192/91 R
(58) Field of Search ..................... 192/83, 84.6, 90, 192/91 R

(56) References Cited

U.S. PATENT DOCUMENTS

| | | | | | |
|---|---|---|---|---|---|
| 4,745,999 A | * | 5/1988 | Brugger et al. | ............... | 192/83 |
| 5,002,166 A | * | 3/1991 | Leigh-Monstevens et al. | ... | 192/83 |
| 5,135,091 A | * | 8/1992 | Albers et al. | .................. | 192/83 |
| 5,273,143 A | * | 12/1993 | Voss et al. | ..................... | 192/83 |
| 5,839,561 A | * | 11/1998 | Koda et al. | .................... | 192/90 |
| 5,906,256 A | * | 5/1999 | Hayashi et al. | ................ | 192/83 |
| 5,954,176 A | * | 9/1999 | Ishihara et al. | ............... | 192/83 |
| 6,170,624 B1 | * | 1/2001 | Arai et al. | ..................... | 192/83 |
| 6,218,743 B1 | * | 4/2001 | Hayashi et al. | ............ | 307/10.6 |

FOREIGN PATENT DOCUMENTS

| EP | 0 090 945 A2 | * | 10/1983 |
|---|---|---|---|
| JP | 11-247886 A | | 9/1999 |

* cited by examiner

*Primary Examiner*—Rodney H. Bonck
(74) *Attorney, Agent, or Firm*—Shinjyu Global IP Counselors, LLP

(57) ABSTRACT

A motorized clutch operating system in which it is possible to operate the clutch with a clutch pedal when there is a problem with the motor is provided. A clutch actuator 5 that serves as a mechanism for operating a clutch of a vehicle is equipped with a hydraulic mechanism 32, a motor control mechanism 31, and a clutch pedal device 13. The hydraulic mechanism 32 is a mechanism for operating the clutch. Motor control mechanism 31 executes automatic engagement and disengagement of the clutch using a motor 16 that drives the hydraulic mechanism 32 in accordance with a prescribed input signal. A clutch pedal device 14 executes manual engagement and disengagement of the clutch by driving the hydraulic mechanism 32.

16 Claims, 10 Drawing Sheets

CLUTCH OPERATING SYSTEM AND A HYDRAULIC MECHANISM USED IN THE SAME

BACKGROUND OF THE INVENTION

1. Field of the Invention

The present invention relates to a clutch operating system for a vehicle. More specifically, the present invention relates to a system having a manual clutch operating unit and an automatic clutch operating unit that includes a motor.

2. Background Information

Manual transmissions are still the main type of transmission used in buses and trucks. With a manual transmission, a gearshift lever near the driver's seat is linked mechanically to the transmission by such linking mechanisms as a control rod and the like. Consequently, when shifting it is necessary to drive the gear mechanism by operating the shift lever. Thus, when frequent shifting is required, the shifting operation becomes a large burden for the driver.

In order to solve this problem, remote control manual transmission devices have been developed which are provided with a gear changing device on the manual transmission and a transmission ECU for controlling the gear changing device using an electric signal. With this structure, the gear can be changed relatively easy. Since using only a small amount of strength is required to operate the shift lever, the burden on the driver with regards to shifting is reduced.

Furthermore, in order to further reduce the burden on the driver with regards to shifting, there exist automatic transmissions that are provided with a clutch actuator. The clutch actuator automatically engages and disengages the clutch, thus, making it possible to change gears without depressing a clutch pedal.

There are also so-called semiautomatic transmissions that make it possible to switch selectively between the aforementioned automatic shifting and manual shifting.

The aforementioned clutch actuator drives the clutch using a signal from a transmission ECU. The clutch actuator has, for example, a master cylinder, a motion direction converting mechanism, and a motor. The master cylinder is connected to a slave cylinder that is disposed in the vicinity of the release device of the clutch. The motion converting member has a rod, a worm wheel, and a worm gear. The rod abuts against the piston of the master cylinder. The worm wheel is fixed to the other end of the rod and constitutes a crank mechanism. The worm gear meshes with the worm wheel and is fixed to the rotational shaft of the motor. When the motor rotates, the worm gear rotates the worm wheel, causing the rod to move linearly and drive the piston of the master cylinder. As a result, hydraulic pressure is supplied from the master cylinder to the slave cylinder, the slave cylinder drives the release mechanism, and the clutch disengages.

If the motor malfunctions or otherwise is unable to rotate, the cylinder or other hydraulic mechanism that drives the clutch will become inoperable and the clutch will remain in the engaged or disengaged condition, also being unable to operate.

In view of the above, there exists a need for clutch operating system and a hydraulic mechanism that overcomes the above mentioned problems in the prior art. This invention addresses this need in the prior art as well as other needs, which will become apparent to those skilled in the art from this disclosure.

SUMMARY OF THE INVENTION

An object of the present invention is to provide a motorized clutch operating system in which it is possible to operate the clutch with a clutch pedal when there is a problem with the motor.

A clutch operating system for operating a clutch of a vehicle in accordance with a first aspect of the present invention is provided with a hydraulic mechanism, an automatic clutch operating unit, and a manual clutch operating unit. The hydraulic mechanism operates the clutch. The automatic clutch operating unit has a motor that drives the hydraulic mechanism in accordance with a prescribed signal input and executes automatic engagement and disengagement of the clutch. The manual clutch operating unit drives the hydraulic mechanism with a clutch pedal device and executes manual engagement and disengagement of the clutch.

With this clutch operating system, the clutch can be operated using either the motor or the clutch pedal device.

A clutch operating system in accordance with a second aspect of the present invention is the clutch operating system of the first aspect, wherein the hydraulic mechanism is provided with a piston, a first hydraulic unit, and a second hydraulic unit. The piston operates the clutch using hydraulic pressure. The first hydraulic unit is driven by the motor and drives the piston. The second hydraulic unit is driven by the clutch pedal device and drives the piston when the motor malfunctions.

With this clutch operating system, the piston can be driven by using the clutch pedal to operate the second hydraulic unit when there is a problem with the motor and the first hydraulic unit cannot be operated.

A hydraulic mechanism for use in a clutch operating system in accordance with a third aspect of the present invention operates a vehicle clutch using a motor during normal operation and makes it possible to operate the clutch using a clutch pedal device when there is a problem with the motor. Further, the hydraulic mechanism is provided with a first cylinder and a second cylinder. The first cylinder is driven by the motor. The second cylinder can be supplied with hydraulic pressure from the first cylinder and the clutch pedal device. The second cylinder is provided with a cylinder tube, a first piston, and a second piston. The first piston is disposed inside the cylinder tube and is driven by hydraulic pressure from the first cylinder. Further, the first piston supplies hydraulic pressure to the clutch. The second piston is disposed inside the cylinder tube, and drives the first piston when hydraulic pressure is supplied from the clutch pedal device. Further, the second piston also supplies hydraulic pressure to the clutch.

With this hydraulic mechanism, when there is a problem with the motor and the first cylinder cannot be operated, operating the clutch pedal device will cause the second cylinder to drive the first piston. Thus the clutch can be operated by means of the clutch pedal even when there is a problem with the motor.

A hydraulic mechanism for use in a clutch operating system in accordance with a fourth aspect of the present invention is the hydraulic mechanism of the third aspect, wherein an oil reservoir is further provided. The cylinder tube has three ports. The first port communicates between the first cylinder and the space between the first piston and the second piston. The second port communicates with the oil reservoir. The third port communicates with the clutch pedal. The second piston has an oil path and a one-way valve. The oil path communicates between the space and the second port. The one-way valve closes the oil path when hydraulic pressure is applied to the space and opens the oil path when hydraulic pressure is applied to the third port from the clutch pedal.

With this hydraulic mechanism, during normal operation, the first piston is driven when oil is supplied from the first piston to the space of the second piston. When this occurs, the one-way valve of the second piston has closed the passage between the space and the second port.

When there is a problem with the motor and the first piston cannot be operated, both the first and second pistons can be operated by operating the clutch pedal device and supplying hydraulic pressure to the third port.

Assume that at a time when there is a problem with the motor and the first cylinder cannot be operated, the first piston is in the clutch disengaged position and there is a space formed between the first piston and the second piston. In such a case, when the clutch pedal is operated, the one-way valve opens and the oil inside the space passes through the oil path of the second piston and returns to the oil reservoir through the second port. Thus the first piston approaches the second piston and, as a result, the first piston and second piston move as a single unit thereafter.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS (1) Overall Structure

Figure 1:
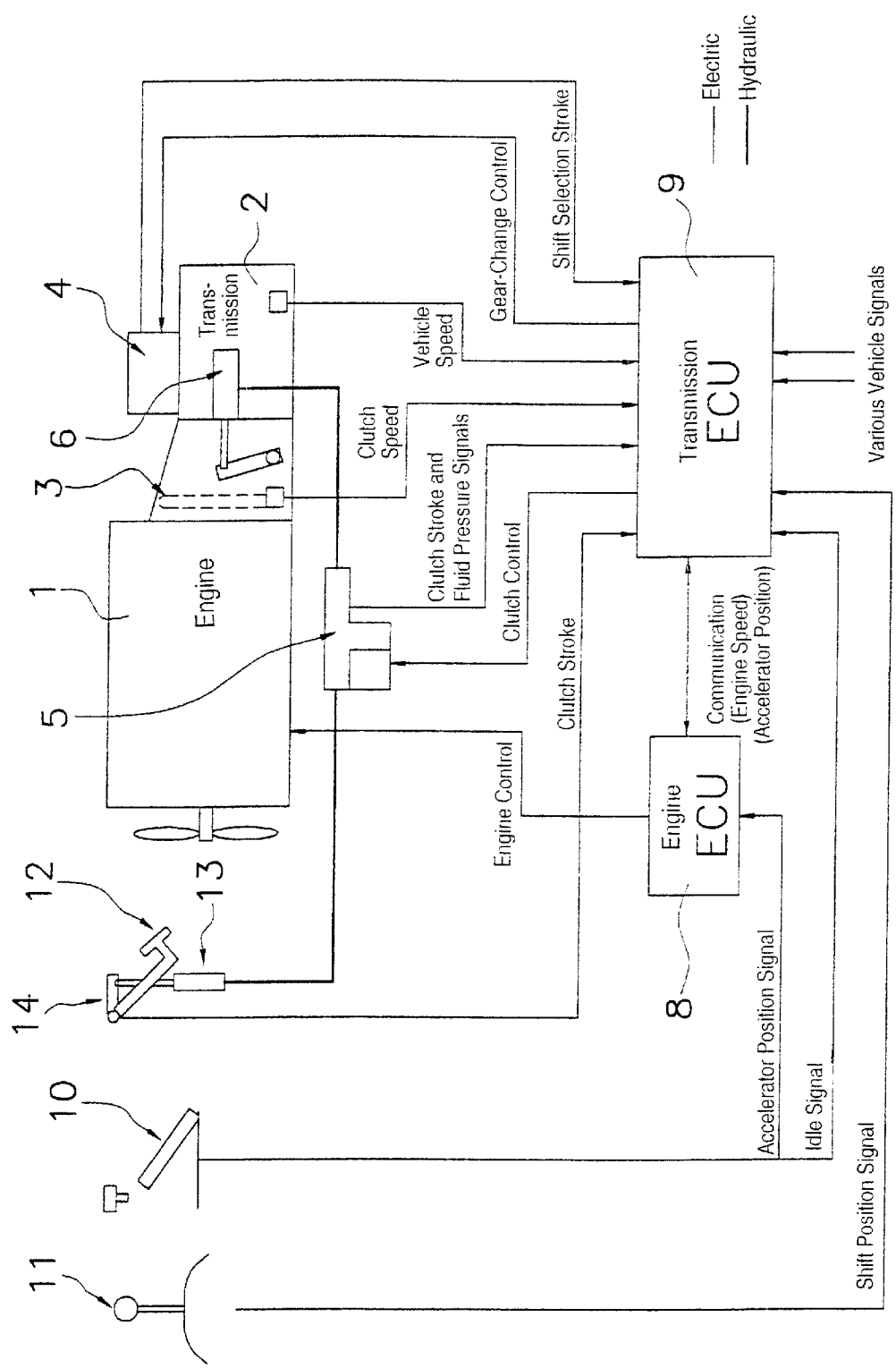
FIG. 1 is a diagrammatical view of a manual transmission automatic gear changing system in accordance with a preferred embodiment of the present invention.

FIG. 1 illustrates a manual transmission automatic gear changing system in accordance with a preferred embodiment of the present invention. In FIG. 1, a clutch 3 that includes a dry single-plate clutch disk is disposed between an engine 1 and a transmission 2. A gear changing device 4 is provided as an actuator for driving the transmission 2. A clutch actuator 5 is provided as an actuator for driving the clutch 3. The clutch actuator 5 has a hydraulic mechanism 32 (discussed later) that is connected through a hydraulic mechanism to a slave cylinder 6, which is provided close to the clutch 3.

This system is provided with an engine ECU 8 and a transmission ECU 9 that can communicate with each other. For example, the two units can exchange information regarding the engine speed and the accelerator position. The engine ECU 8 controls the engine 1 and receives an accelerator position signal from an accelerator pedal 10.

The transmission ECU 9 chiefly controls the clutch and executes gear-change control. The transmission ECU 9 sends a clutch control signal to the clutch actuator 5 and a gear-change control signal to the gear changing device 4. These control signals drive various types of motors. The transmission ECU 9 also receives signals from various sensors. More specifically, the transmission ECU 9 receives the following inputs: an idle signal from the accelerator pedal 10, a shift position signal from a shift lever 11, a clutch stroke signal from a clutch pedal 12, a clutch stroke signal and a fluid pressure signal from the clutch actuator 5, a clutch speed or clutch rotational signal from the clutch 3, a vehicle speed signal from the transmission 2, and a shift selection stroke signal from the gear changing device 4.

In the system just described, the clutch operation and gear changing operation are controlled automatically by the transmission ECU 9. Also, the driver can change gears manually when desired by operating the shift lever 11.

A cylinder 13, which is linked to the clutch pedal 12, is connected to the slave cylinder 6 through the clutch actuator 5 and an oil path. Therefore, when the driver operates the clutch pedal 12, hydraulic pressure is supplied from the cylinder 13 to the slave cylinder 6 and the clutch 3 is disengaged and engaged. Thus, the clutch pedal 12 and the cylinder 13 constitute a clutch pedal device 14. In this embodiment, the clutch pedal 12 is only for emergency use when an electrical problem has occurred in the clutch actuator 5, etc.; during normal driving the clutch pedal 12 is folded up.

(2) Structure of the Clutch Actuator

Figure 2:
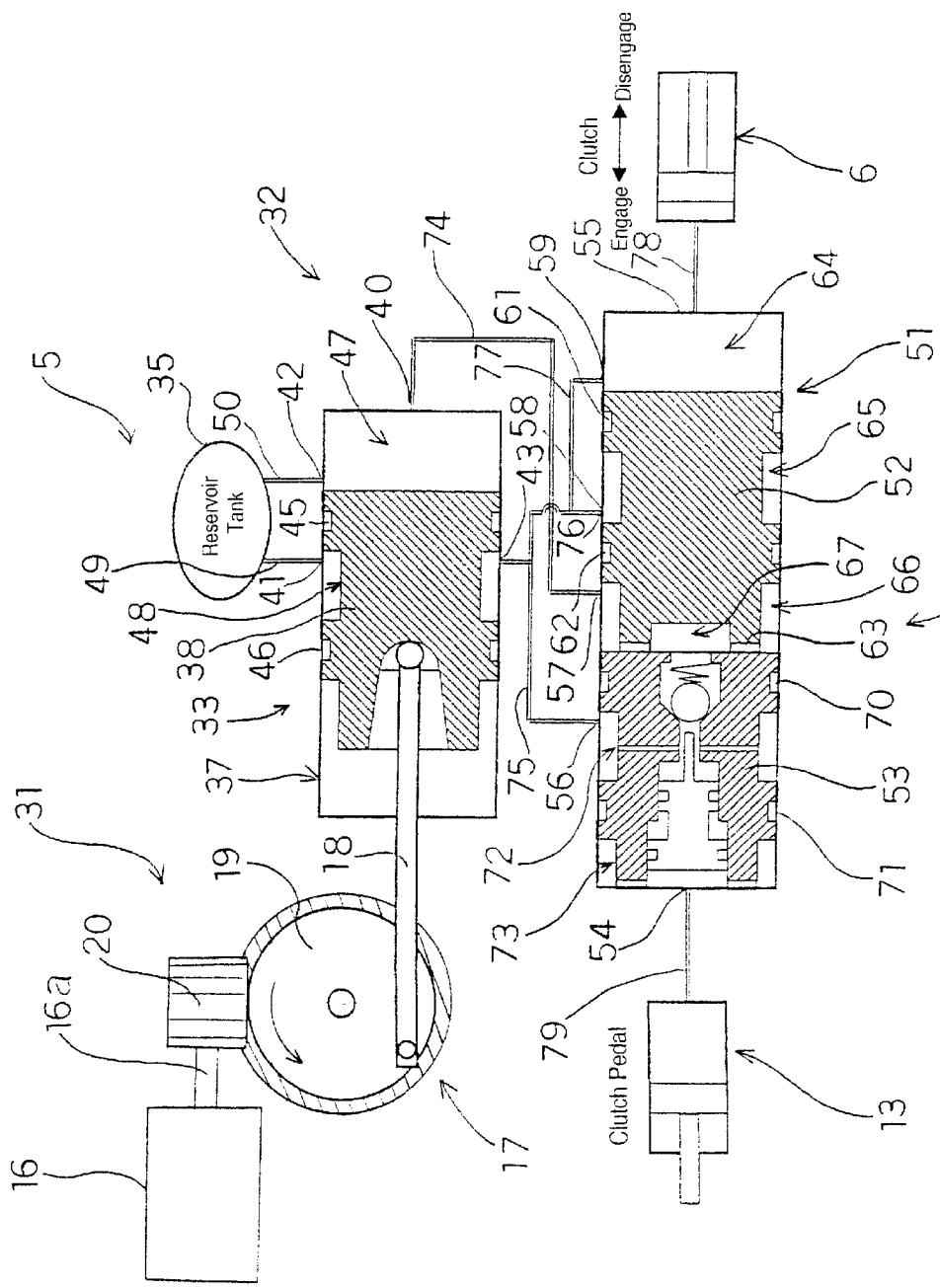
FIG. 2 is a schematic view of a clutch operating system in an initial clutch state in accordance with a preferred embodiment of the present invention.

The structure of the clutch actuator is described in detail using FIG. 2. The clutch actuator 5 has automatic clutch and manual clutch operation functions. The automatic clutch operation function supplies hydraulic pressure to the slave cylinder 6 of the clutch 3 in response to a clutch control signal from the transmission ECU 9. The manual clutch operation function supplies hydraulic pressure to the slave cylinder 6 of the clutch 3 in response to hydraulic pressure from the clutch pedal device 14. More particularly, in this embodiment, the clutch actuator 5 performs the automatic clutch operation function during normal driving. The manual clutch operation function is used in emergency situations when the automatic clutch operation function does not work.

The clutch actuator 5 chiefly has a control motor mechanism 31 and the previously described hydraulic mechanism 32.

The control motor mechanism 31 includes a motor 16. The motor 16 may be a DC motor, AC motor, SR motor, stepping motor, or the like. The control motor mechanism 31 also includes a motion converting mechanism 17 that converts the rotation of the motor 16 into linear motion. The motion converting mechanism 17 includes a rod 18, a worm wheel 19, and a worm gear 20. The worm wheel 19 is latched to one end of the rod 18 and—together with the rod 18—constitutes a crank mechanism. The worm gear 20 meshes with the worm wheel 19. When the worm gear 20 rotates, the worm wheel 19 rotates and the rod 18 undergoes linear motion in a lengthwise direction. The motor 16 is disposed close to the worm gear 20. A rotational shaft 16a of the motor 16 is fixed to one end of the worm gear 20. As a result, the torque of the motor 16 is inputted to the worm gear 20. The rotation and stopping of the motor 16 is controlled by a clutch control signal from the previously described transmission ECU 9.

The hydraulic mechanism 32 is driven by the motor 16 of the control motor mechanism 31 and serves to engage and disengage the clutch by supplying hydraulic pressure to the slave cylinder 6 of the clutch 3. The hydraulic mechanism 32 can also be driven by hydraulic pressure from the clutch pedal device 14. The hydraulic mechanism 32 chiefly has a first cylinder 33 and a second cylinder 34. The first cylinder 33 is driven by the control motor mechanism 31 and serves to supply hydraulic pressure to the second cylinder 34. The second cylinder 34 is driven by the first cylinder 33 and serves to supply hydraulic pressure to the slave cylinder 6 of the clutch 3. It is also possible for the second cylinder 34 to receive hydraulic pressure from the cylinder 13 of the clutch pedal device 14 and supply hydraulic pressure to the slave cylinder 6 of the clutch. Thus the second cylinder 34 can be driven by the driving torque from the motor 16 or by the operating force from the clutch pedal device 14.

The hydraulic mechanism 32 also has a reservoir tank 35. The reservoir tank 35 serves to store the oil that circulates through the first cylinder 33 and the second cylinder 34. More specifically, oil moves between the reservoir tank 35 and the second cylinder 34 via the first cylinder 33 (discussed later).

The structure of the first cylinder 33 will now be described. The first cylinder 33 chiefly has a cylinder tube 37 and a piston 38. The piston 38 is disposed inside the cylinder tube and can move in response to hydraulic pressure. The rod 18 of the control motor mechanism 31 is inserted into one end of the cylinder tube 37 (the left end in FIG. 2). The end of the rod 18 abuts against one end of the piston 38 (the left end in FIG. 2).

A first port 40 is formed on the other end (i.e., the end face opposite the end where the rod 18 is inserted) of the cylinder tube 37. The first port 40 is connected to the second cylinder 34 (discussed later). A second port 41, a third port 42, and a fourth port 43 are formed on a side wall of the cylinder tube 37. The third port 42 is disposed closer to the end of the cylinder tube 37 where first port 41 is located. The second port 41 and the fourth port 43 are disposed closer to the end where the rod 18 is inserted and at roughly the same position in terms of the direction in which the piston moves. The second port 41 and the third port 42 are connected to the reservoir tank 35 through an oil path 49 and an oil path 50, respectively. The fourth port 43 is connected to the second cylinder 34 (discussed later).

The piston 38 is preferably a cylindrical member having a first land 45 and a second land 46 on an outer circumference thereof. The first land 45 and the second land 46 are ring-shaped protruding parts formed on the outside surface of the main body of the piston 38 and contact the inside surface of the cylinder tube 37 such that they can slide therein. The first land 45 is formed on the side of the piston 38 that is closer to the first port 40. The second land 46 is formed at a prescribed distance from the first land 45. As a result, a first oil chamber 47 is secured between the piston 38 and the portion of the cylinder tube 37 ranging from the end of the piston to the end of the cylinder where the first port 40 is formed. A ring-shaped second oil chamber 48 is also secured between the first land 45 and the second land 46. A seal member is arranged on the outside surface of each land 45, 46. Thus, the first oil chamber 47 and the second oil chamber 48 are kept in a sealed state.

FIG. 2 shows the initial state with the clutch engaged. The piston 38 is positioned at roughly the middle of the cylinder tube 37. In this state, the second port 41 and the fourth port 43 open into the second oil chamber 48 and the third port 42 opens into the first oil chamber 47.

The second cylinder 34 is described with reference to FIGS. 3 and 4. The second cylinder 34 chiefly has a cylinder tube 51 and two pistons, i.e., a first piston 52 and second piston 53, disposed inside the cylinder tube 51. As seen in FIG. 2, the cylinder tube 51 is arranged such that it can receive hydraulic pressure either from the first cylinder 33 or from the cylinder 13 of the clutch pedal device 14. The first piston 52 is arranged such that it is driven by hydraulic pressure from the first cylinder 33 and delivers hydraulic pressure to the slave cylinder 6 of the clutch 3. The second piston 53 is arranged such that it is driven by hydraulic pressure from the cylinder 13 of the clutch pedal device 14 and delivers hydraulic pressure to the slave cylinder 6 of the clutch 3 by driving the first piston 52. In other words, the first piston 52 is arranged so that it can be driven by the first cylinder 33 as well as the cylinder 13 of the clutch pedal device 14.

Figure 3:
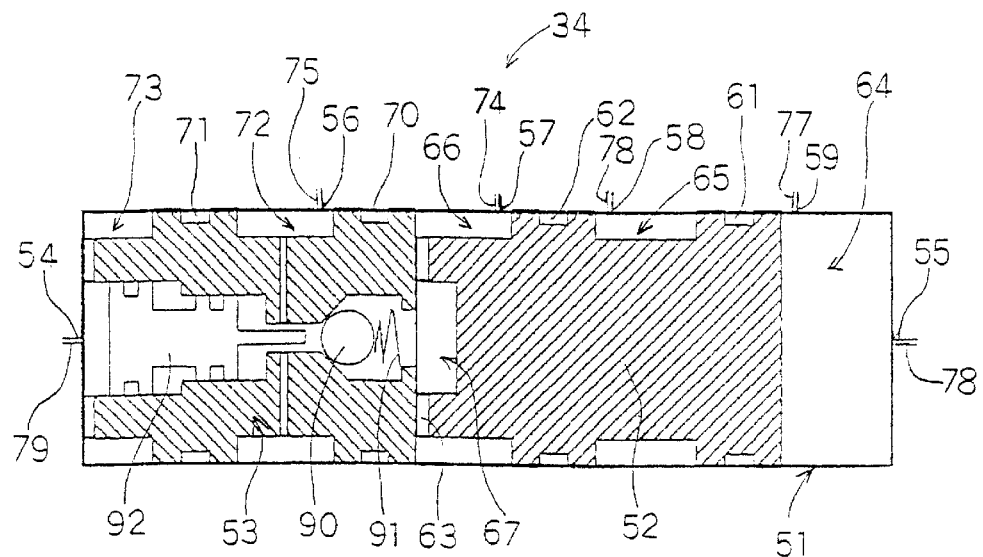
FIG. 3 is an enlarged view of a second cylinder of the clutch operating system of FIG. 2.

A first port 54 is formed on one end of the cylinder tube 51 (the left end in FIGS. 2 and 3) and a second port 55 is formed on the other end (the right end in FIGS. 2 and 3). The first port 54 is connected to the cylinder 13 of the clutch pedal device 14 via an oil path 79. The second port 55 is connected to the slave cylinder 6 of the clutch 3 via oil path 78.

A third port 56, a fourth port 57, a fifth port 58, and a sixth port 59 are formed in the side wall of the cylinder tube 51 preferably in the order listed between the first port 54 and the second port 55. These ports 56 to 59 are connected to the first cylinder 33 via oil paths. More specifically, as shown in FIG. 2, the fourth port 57 is preferably connected to the first port 40 of the first cylinder 33 via a first oil path 74. The third port 56 is preferably connected to the fourth port 43 of the first cylinder 33 via a second oil path 75. A third oil path 76 and a fourth oil path 77 branch off from an intermediate point along the second oil path 75 and preferably connect to the fifth port 58 and the sixth port 59, respectively. Thus, the ports 56, 58, and 59 are connected to the fourth port 43 of the first cylinder 33 via the oil paths 75, 76, and 77. The ports 56, 58, and 59 are also connected to the reservoir tank 35 via the second oil chamber 48, the second port 41, and the oil path 49.

The first piston 52 is disposed inside the cylinder tube 51 on the side closer to the second port 55. The second piston 53 is disposed inside the cylinder tube 51 on the side closer to the first port 54. The first piston 52 is preferably a cylindrical member having a first land 61 and a second land 62 on the outer circumference thereof. The first land 61 and the second land 62 are ring-shaped protruding parts formed on the outside surface of the main body of the piston and contact the inside surface of the cylinder tube 51 such that they can slide thereon. The first land 61 is formed on a side of the first piston 52 that is closer to the second port 55 and the second land 62 is formed at a prescribed distance from the first land 61. As a result, a first oil chamber 64 is secured between the first piston 52 and the portion of the cylinder tube 51 ranging from the end of the piston to the end of the cylinder where the second port 55 is formed. A ring-shaped second oil chamber 65 is also secured between the first land 61 and the second land 62. A seal member is arranged on the outside surface of each land 61, 62 and thus, the first oil chamber 64 and the second oil chamber 65 are kept in a sealed state.

The second piston 53 is a cylindrical member having a first land 70 and a second land 71 on the outer circumference thereof. The first land 70 and the second land 71 are ring-shaped protruding parts formed on the outside surface of the main body of the piston and contact the inside surface of the cylinder tube 51 such that they can slide therein. The first land 70 is formed on the side of the second piston 53 that is closer to the first piston 52. The second land 71 is formed at a prescribed distance from the first land 70. As a result, a ring-shaped fourth oil chamber 72 is secured between the first land 70 and the second land 71. A seal member is arranged on the outside surface of each land 70, 71 and thus the fourth oil chamber 72 is kept in a sealed state.

Figure 4:
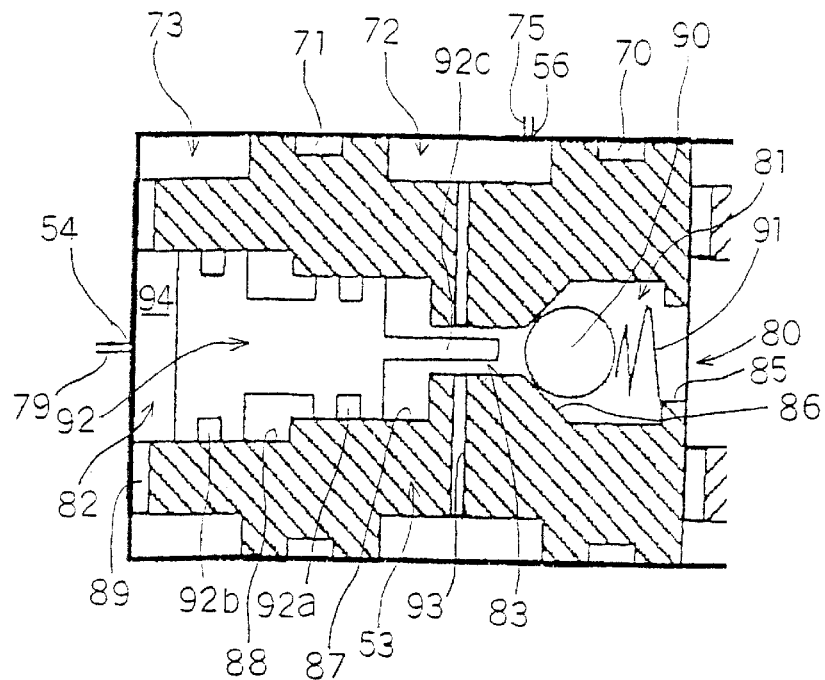
FIG. 4 is an enlarged partial view of the second cylinder of FIG. 3.

Referring to FIGS. 3 and 4, the second piston 53 has a hole 80 that passes there-through in the lengthwise or piston movement direction. As will be discussed later, the hole 80 constitutes an oil path and houses a one-way valve. The portion of the hole 80 that is close to the first piston 52 forms a first space 81. The first space 81 has a fixed length in the lengthwise direction. A flange 85 protrudes slightly in the inward radial direction provided at the end thereof that is closer to the first piston 52. The wall surface on the opposite end of the space is a tapered surface 86 that narrows in the direction toward the first port 54. A check ball 90 and a coil spring 91 are disposed inside the first space 81. The check ball 90 is pressed against the tapered surface 86 by the coil spring 91, which is supported by the flange 85. With this structure, the check ball 90 keeps the oil path closed when hydraulic pressure acts from the direction of the first piston 52 and can move away from the tapered surface 86. The check ball 90 can open the oil path when a force acts from the opposite direction. The end of the hole 80 that is close to the first port 54 forms a second space 82. The second space 82 has a larger diameter than the first space 81. The second space 82 has a first inside surface 87 positioned closer to the first space 81 and a second inside surface 88 positioned closer to the first port 54. The diameter of the second inside surface 88 is larger than that of the first inside surface 87. The first space 81 and the second space 82 are joined by a passage 83 whose diameter is smaller than that of either the first space 81 or the second space 82. The passage 83 has a smaller diameter than the check ball 90 and is separated from the first space 81 by the check ball 90.

A third piston 92 is disposed inside the second space 82. The third piston 92 moves inside the second space 82 due to hydraulic pressure from the first port 54 and serves to move the check ball 90 from the closed position to the open position. The third piston 92 is a cylindrical member having a first land 92a and a second land 92b on the outer circumference thereof. The first land 92a and the second land 92b are ring-shaped protruding parts formed on the outside surface of the main body of the piston. The first land 92a and second land 92b contact the first inside surface 87 and the second inside surface 88, respectively, of the second space 82 such that they can slide therein. The first land 92a is formed on the side of the third piston 92 that is closer to the passage 83. The second land 92b is formed on the side of the third piston 92 that is closer to the first port 54. Since a seal member is arranged on the outside surface of each land 92a, 92b, the spaces at opposite ends of the third piston 92—i.e., the passage 83 and oil chamber 94 (discussed later), which is on the side near the first port 54—are separated from each other. A projection 92c that extends toward the check ball 90 is formed on the end face of the third piston 92 that faces the passage 83. The projection 92c extends within the passage 83 and its tip approaches the check ball 90. When the third piston 92 moves inside the second piston 53 toward the check ball 90, the projection 92c pushes the check ball 90 and moves it from the closed position to the open position. Thus, the check ball 90 and the third piston 92 form a one-way valve inside the second piston 53.

The passage 83 is connected to the fourth oil chamber 72 via a plurality of oil paths 93 that extend radially outward through the second piston 53. That is, when the check ball 90 is in the open position, the first space 81 communicates with the fourth oil chamber 72 via the passage 83 and the oil paths 93.

A sixth oil chamber 94 is secured inside the second space 82 between the third piston 92 and the end face of the cylinder tube 51 where the first port 54 is formed. Since a plurality of radially oriented grooves are formed in the end face 89 of the second piston 53 that faces toward the first port 54, the sixth oil chamber 94 and fifth oil chamber 73 communicate with each other even when the second piston 53 has moved fully toward the first port 54.

Next, the portions of the first piston 52 and the second piston 53 that contact each other are described. A cylindrical part 63 that follows the outer circumferential edge of the piston and extends in the lengthwise direction is formed on the end of the first piston 52 that faces the second piston 53. A seventh oil chamber 67 inside the cylindrical part 63 communicates with the first space 81 of the second piston 53. Also, since radial grooves are formed in the tip of the cylindrical part 63, the seventh oil chamber 67 communicates with the third oil chamber 66 on the outside thereof even when the first piston 52 has fully approached or has contacted the second piston 53.

FIGS. 2 to 4 show the initial state with the clutch 3 engaged. The first piston 52 and the second piston 53 are positioned fully toward the first port 54 inside the cylinder tube 51. In this state, the second piston 53 abuts against the end face of the cylinder tube 51 where the first port 54 is located. Further, the cylindrical part 63 of the first piston 52 abuts against the end face of the second piston 53. In this state, the third port 56 opens into the fourth oil chamber 72 of the second piston 53, the fourth port 57 opens into third oil chamber 66 of the first piston 52, the fifth port 58 opens into second oil chamber 65 of the first piston 52, and the sixth port 59 opens into first oil chamber 64.

When the first piston 52 has moved fully toward the second port 55 and the clutch 3 is disengaged, the fifth port 58 and the sixth port 59 are closed by the second land 62 and the first land 61, respectively. (See FIG. 5.)

(3) Gear Change Operation During Normal Driving

Figure 5:
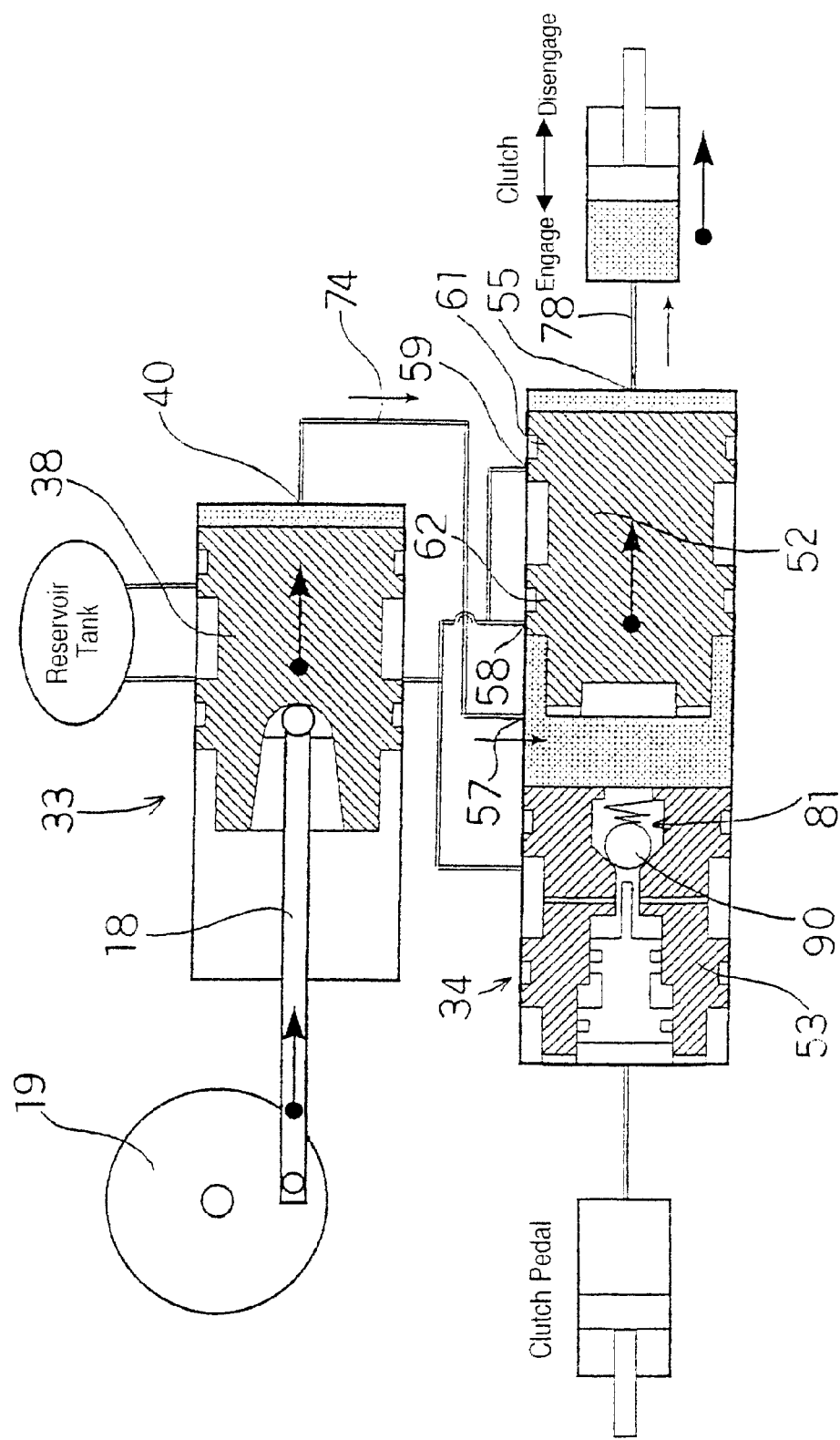
FIG. 5 is a partial schematic view of the clutch operating system of FIG. 2 with the clutch disengaged.

Referring to FIGS. 1, 2, and 5, the transmission ECU 9 executes the gear shift operation in accordance with a shift position signal from the shift lever 11 during manual shifting or signals from various sensors during automatic shifting.

More specifically, the transmission ECU 9 outputs a clutch control signal to the clutch actuator 5, causing the motor 16 to rotate the worm gear 20. As shown in FIG. 5, this drives the worm wheel 19 and the rod 18 moves lengthwise, pushing the piston 38. Consequently, hydraulic pressure is supplied from the first port 40 of the first cylinder 33 to the fourth port 57 of the second cylinder 34 via the first oil path 74. As a result, the first piston 52 moves toward the second port 55, hydraulic pressure is supplied from the second port 55 to cylinder 6 of the clutch 3 via oil path 78, and the clutch 3 disengages. Although hydraulic pressure acts on the first space 81 of the second cylinder 34 during this operation, the second piston 53 simply functions as a wall of the oil chamber because of the one-way valve formed by the check ball 90.

Next, the transmission ECU 9 sends a gear-change control signal to the gear changing device 4 and changes the gear by driving a motor (not shown).

Figure 6:
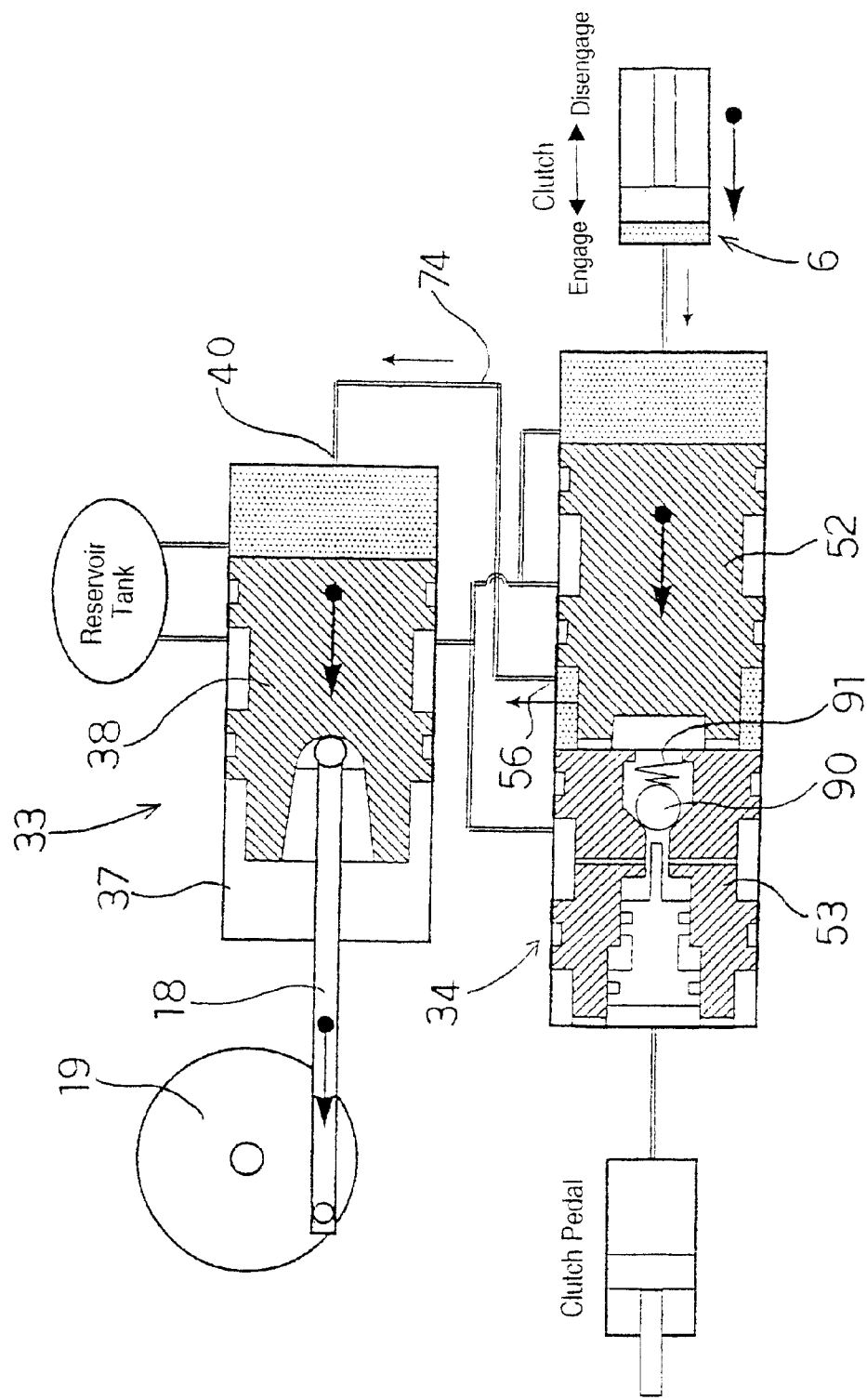
FIG. 6 is a partial schematic view of the clutch operating system of FIG. 2 with the clutch engaged.

Lastly, the transmission ECU 9 outputs a clutch control signal to the clutch actuator 5, causing the motor 16 to rotate the worm gear 20 in the opposite direction. As shown in FIG. 6, the worm wheel 19 is driven and the rod 18 and the piston 38 move backward out of the cylinder tube 37. As a result, oil flows from the third port 56 of the second cylinder 34 to the first port 40 of the first cylinder 33 via the first oil path 74. Then the first piston 52 moves toward the second piston 53, causing the hydraulic pressure supplied to the slave cylinder 6 to be removed. As a result, the piston of cylinder 6 returns due to a spring (not shown) and the clutch 3 engages. Furthermore, during the operation described here, the check ball 90 is pressed by the coil spring 91 and in the closed position.

During normal driving, the clutch disengagement and clutch engagement illustrated in FIGS. 5 and 6 are repeated alternately. During such operation, the second piston 53 of the second cylinder 34 functions in the same manner as the wall surfaces of the cylinder tube 51.

(4) Clutch Operation After an Abnormality Occurs in the Motor

Figure 7:
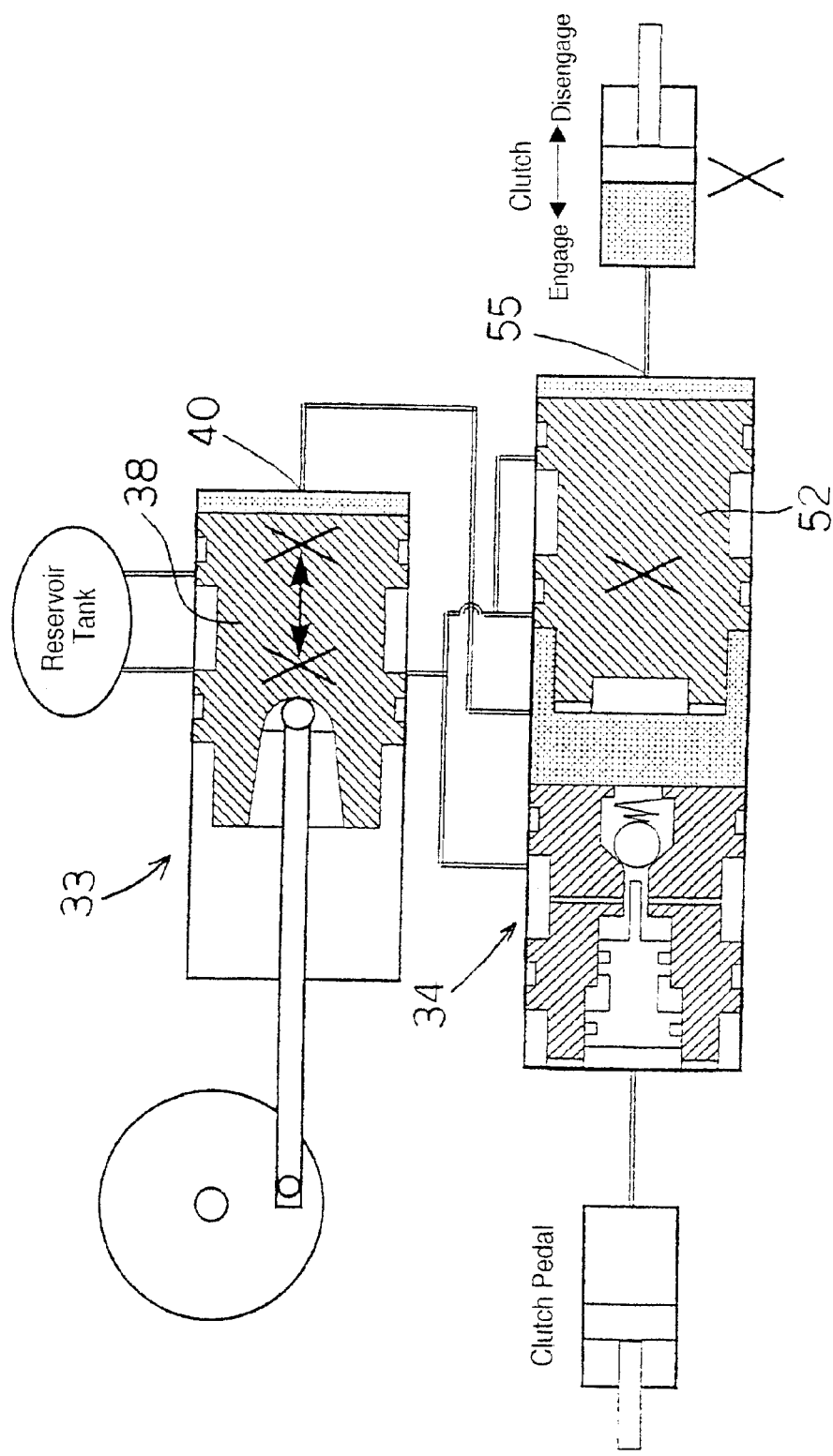
FIG. 7 is a partial schematic view of the clutch operating system of FIG. 2 with clutch engaged when an ECU has a stopped motor due to a malfunction.

Operations after an abnormality occurs will now be explained. FIG. 7 illustrates a case in which the motor has stopped while the clutch is disengaged. In other words, the piston 38 of the first cylinder 33 has stopped in a state where it has moved fully toward the first port 40. Further, the first piston 52 of the second cylinder 34 has stopped in a state where it has moved fully toward the second port 55. Possible causes for the motor 16 stopping include a broken wire and locking up of the motor itself due to wear.

Figure 8:
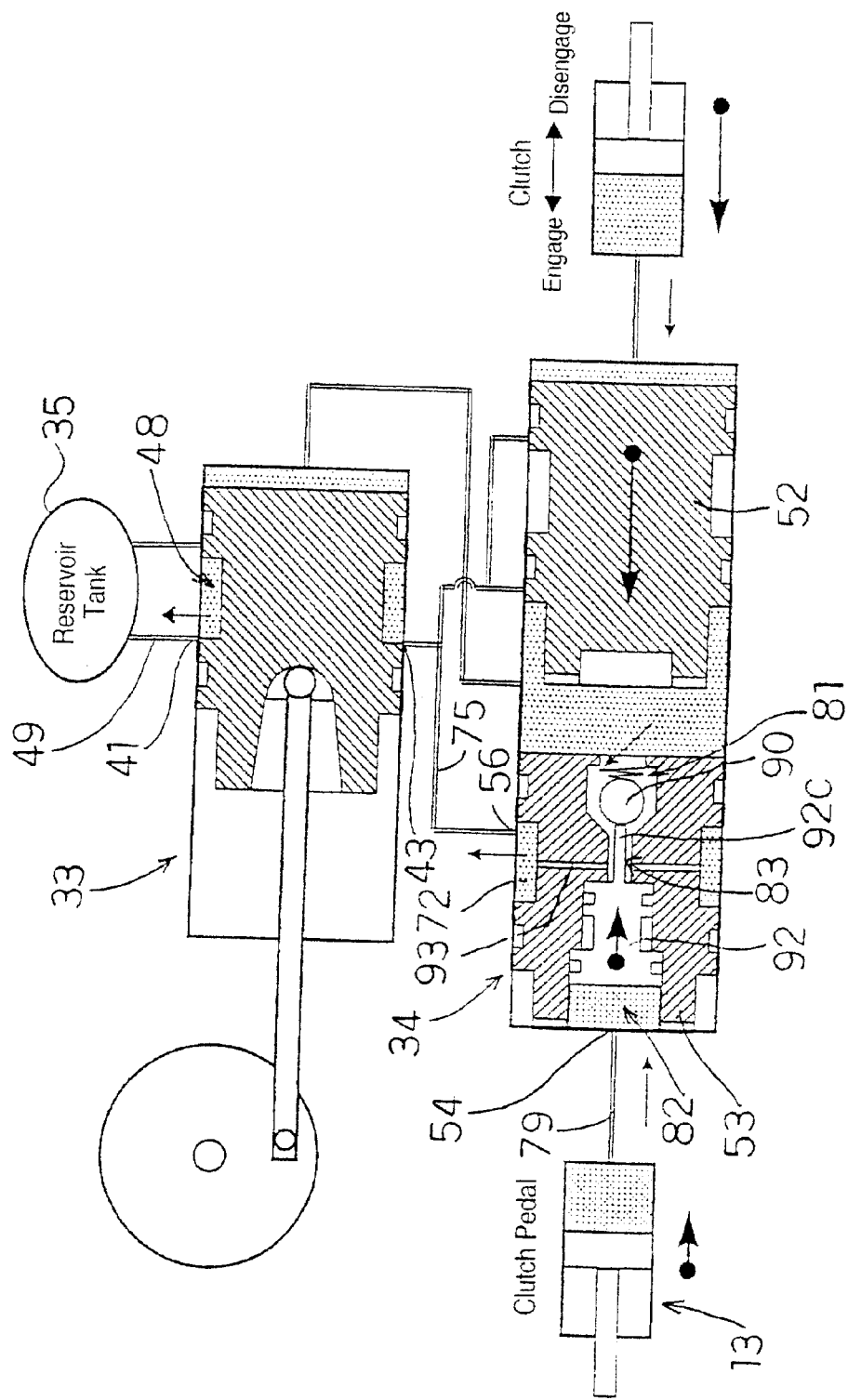
FIG. 8 is a partial schematic view of the clutch operating system of FIG. 2 with a clutch pedal operated after a malfunction.

Next, as seen in FIG. 1, the driver operates the clutch pedal 12. When this is done, oil is supplied from the cylinder 13 to the first port 54 of the second cylinder 34 via the oil path 79, as shown in FIG. 8, and the third piston 92 moves inside the second piston 53. The projection 92c of the third piston 92 pushes the check ball 90. Thus, the check ball 90 moves from the closed position to the open position. Then the oil in the space between the first piston 52 and the second piston 53 flows from the first space 81 of the second piston 53 into the passage 83. This hydraulic oil then passes through oil path 93 and returns to the reservoir tank 35 by passing through the fourth oil chamber 72, the third port 56, the second oil path 75, the fourth port 43 of the first cylinder 33, the second oil chamber 48, the second port 41, and the oil path 49. As a result, the first piston 52 moves closer to the second piston 53.

Figure 9:
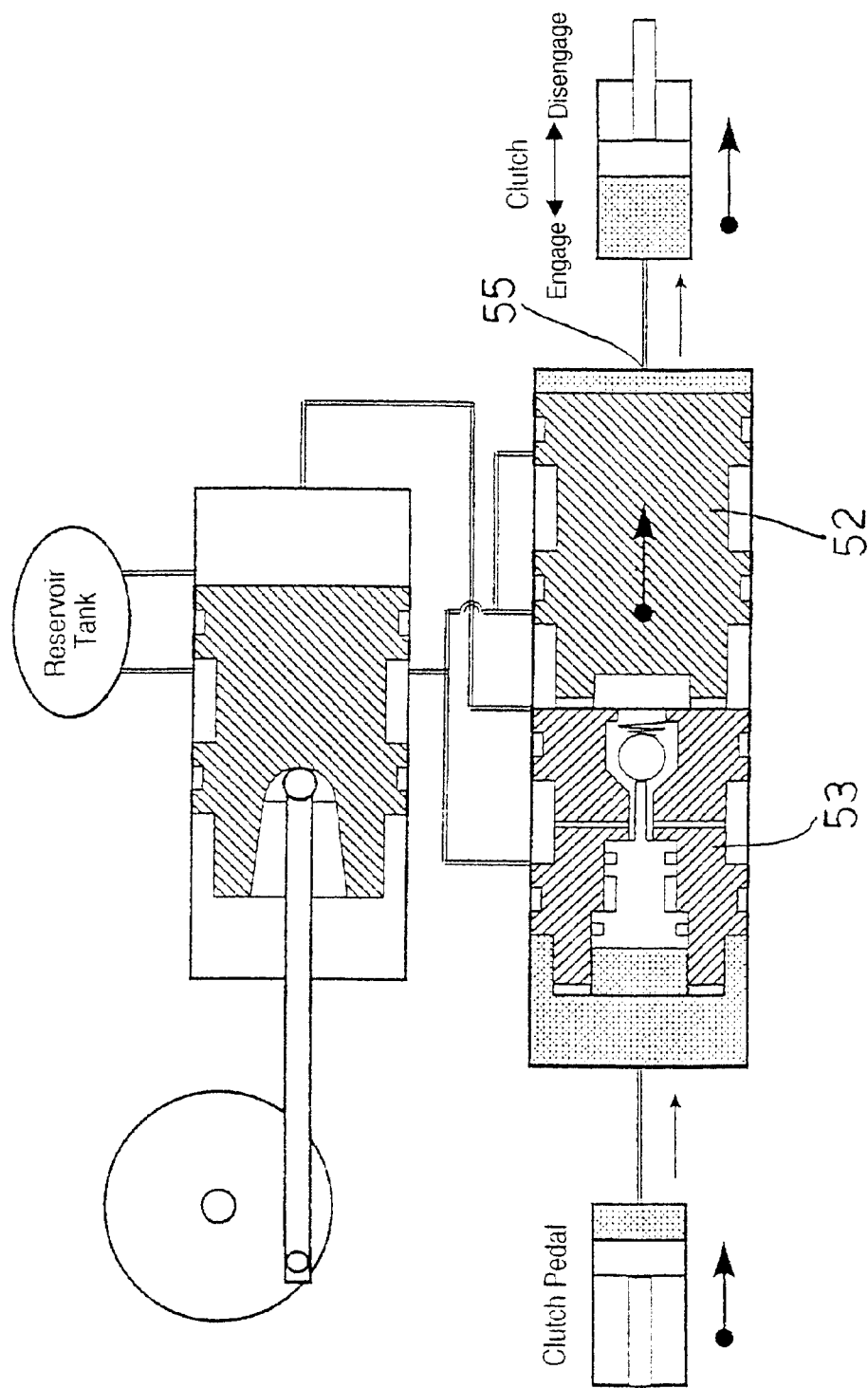
FIG. 9 is a partial schematic view of the clutch operating system of FIG. 2 with the clutch pedal operated after a malfunction wherein the clutch is disengaged.

As the driver continues to depress the clutch pedal 12, the second piston 53 moves toward the first piston 52 due to the hydraulic pressure from the cylinder 13. Eventually, the first piston 52 and the second piston 53 touch each other, as shown in FIG. 9. Afterwards, the second piston 53 pushes the first piston 52 and both pistons move toward the second port 55.

Figure 10:
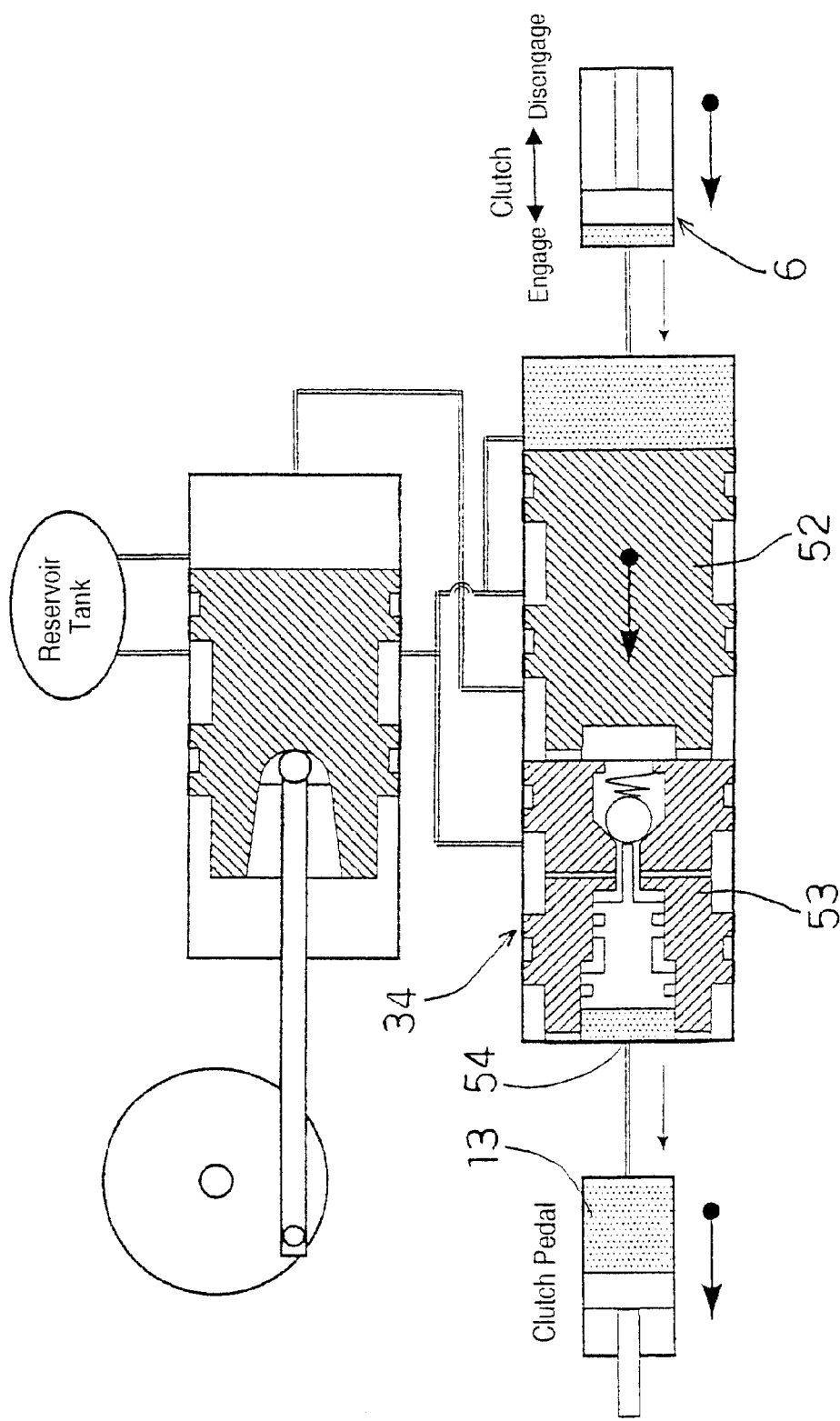
FIG. 10 is a partial schematic view of the clutch operating system of FIG. 2 with the clutch pedal operated after a malfunction wherein the clutch is engaged.

Next, when the driver releases the clutch pedal 12, the hydraulic pressure from the cylinder 13 is removed (as shown in FIG. 10) and both the first piston 52 and the second piston 53 move toward the first port 54. As a result, the hydraulic pressure supplied to the slave cylinder 6 from the second cylinder 34 is removed and the clutch 3 engages.

When driving after a problem has occurred in the motor 16, the clutch engagement and disengagement using the clutch pedal 12 as illustrated in FIGS. 9 and 10 are repeated alternately. During such operation, the first piston 52 and the second piston 53 of the second cylinder 34 function as a single piston.

Figure 11:
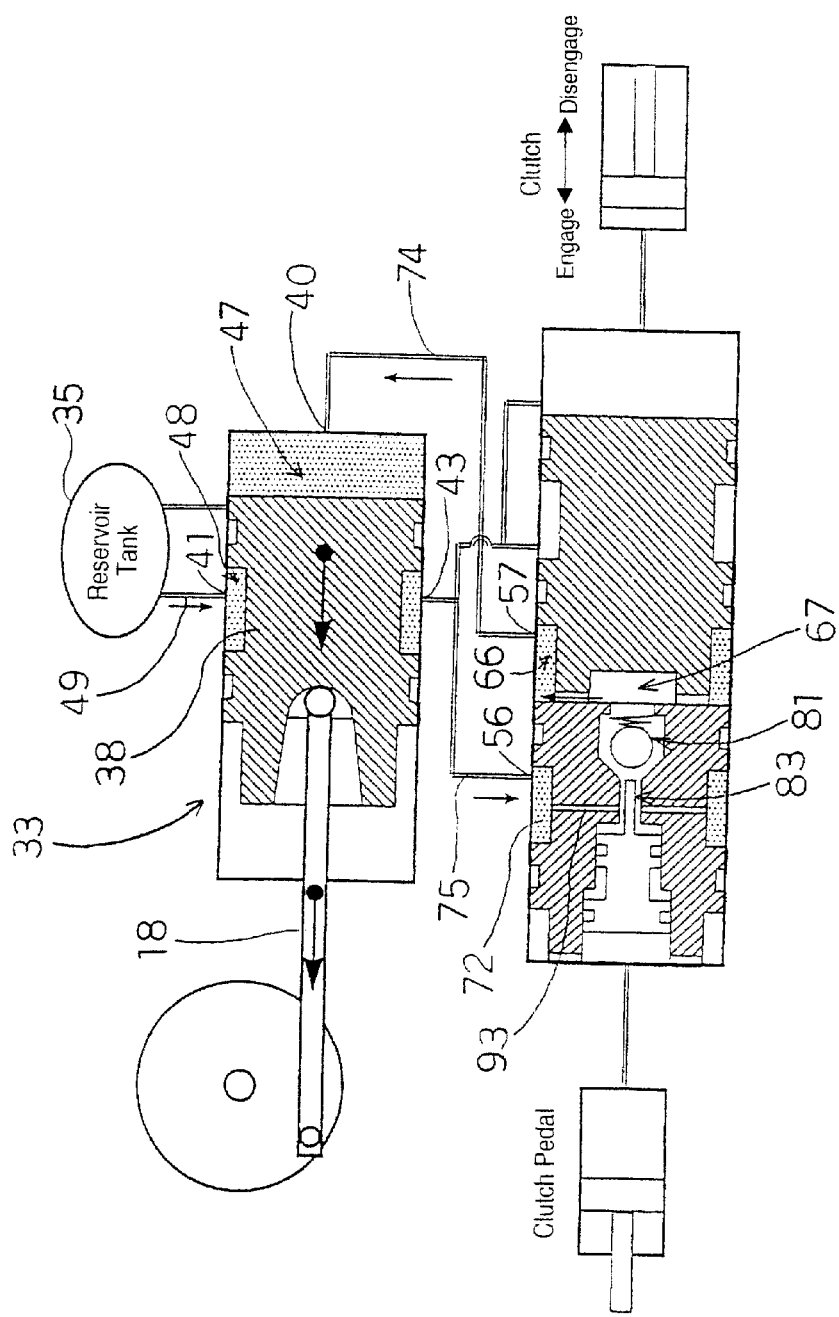
FIG. 11 is a partial schematic view of the clutch operating system of FIG. 2 after returning to normal operation.

The operation in a situation where the motor 16 returns to normal after an abnormality is explained. Assume the motor 16 returns to normal while the clutch is engaged, as shown in FIGS. 1, 2, and 11. A signal is sent to the motor 16 from the transmission ECU 9, causing the motor 16 to rotate and return the piston 38 toward the rod 18. When this occurs, oil in the reservoir tank 35 returns to the first oil chamber 47 of the first cylinder 33 by passing through the oil path 49, the second port 41, the second oil chamber 48, the fourth port 43, the second oil path 75, the third port 56, the fourth oil chamber 72, oil path 93, the passage 83, the first space 81, seventh oil chamber 67, third oil chamber 66, the fourth port 57, the first oil path 74, and the first port 40. As a result, the system ultimately returns to the normal state of clutch engagement shown in FIG. 6.

As previously explained, during normal driving, the first cylinder 33 and the first oil path 74 function as the first hydraulic unit of the hydraulic mechanism 32 for driving the first piston 52. Meanwhile, after an abnormality occurs in the motor 16, the cylinder 13, the oil path 79, and the second piston 53 function as the second hydraulic unit of the hydraulic mechanism 32 for driving the first piston 52.

EFFECTS OF THE INVENTION

A clutch operating system in accordance with the present invention can drive the cylinders with a clutch pedal device when there is a problem with the motor.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A hydraulic mechanism for use in a clutch operating system that operates a vehicle clutch using a motor during normal operation and uses a clutch pedal device to operate the clutch during motor malfunctions, the hydraulic mechanism comprising:

a first cylinder being configured to be driven by the motor; and a second cylinder being configured to be supplied with hydraulic pressure from said first cylinder and the clutch pedal device, said second cylinder comprising, a cylinder tube, a first piston being disposed inside said cylinder tube, said first piston being configured to be driven by hydraulic pressure from said first cylinder, and said first piston being configured to supply hydraulic pressure to the clutch;

a second piston being disposed inside said cylinder tube, said second piston being configured to drive said first piston when hydraulic pressure is supplied from the clutch pedal, said second piston being configured to supply hydraulic pressure to the clutch.

2. The hydraulic mechanism for use in a clutch operating system according to claim 1, further comprising, an oil reservoir, said cylinder tube having
- a first port being configured to communicate between said first cylinder and a space between said first piston and said second piston,
- a second port being configured to communicate with said oil reservoir, and
- a third port being configured to communicate with the clutch pedals; and said second piston having an oil path being configured to communicate between said space and said second port, and a one-way valve that closes said oil path when hydraulic pressure is applied to said space and opens said oil path when hydraulic pressure is applied to said third port from the clutch pedal.

3. The hydraulic mechanism for use in a clutch operating system according to claim 2, wherein said one-way valve comprises a check ball and a biasing member.

4. A clutch operating system for operating a vehicle clutch comprising:

a hydraulic mechanism being configured to operate the clutch, said hydraulic mechanism comprising,
a first cylinder being configured to be driven by said automatic clutch operating unit, and
a second cylinder being configured to be driven by said first cylinder or said manual clutch operating unit to engage and disengage the clutch, said second cylinder comprising,
a cylinder tube,
a first piston disposed inside said cylinder tube, said first piston being configured to be driven by hydraulic pressure from said first cylinder, and said first piston being configured to supply hydraulic pressure to the clutch, and;
a second piston disposed inside said cylinder tube, said second piston being configured to drive said first piston when hydraulic pressure is supplied from said manual clutch operating unit, said second piston being configured to supply hydraulic pressure to the clutch for engagement and disengagement thereof;
an automatic clutch operating unit having a motor being configured to drive said hydraulic mechanism in accordance with a prescribed signal input, said automatic clutch operating unit being configured to execute automatic engagement and disengagement of the clutch; and a manual clutch operating unit being configured to drive said hydraulic mechanism with a clutch pedal device, said manual clutch operating unit being configured to execute manual engagement and disengagement of said clutch, said hydraulic mechanism being configured to be driven alternatively by said automatic clutch operating unit and said manual clutch operating unit.

5. The clutch operating system according to claim 4, wherein said second cylinder comprises a third piston disposed inside a through-hole of said second piston, said third piston configure to open and close a valve in said through-hole to effect movement of said first piston and said second piston to engage and disengage the clutch.

6. The clutch operating system according to claim 5, wherein said valve comprises a check ball and a biasing member.

7. The clutch operating system according to claim 4, further comprising a reservoir configured to store fluid from said hydraulic mechanism.

8. The clutch operating system according to claim 7, wherein said first cylinder comprises a first cylinder piston configured to be driven by said automatic clutch operating unit, said second cylinder comprises a first second cylinder piston configured to be driven by said first cylinder piston or said manual clutch operating unit.

9. A clutch operating system for operating a vehicle clutch comprising:

a hydraulic mechanism being configured to operate the clutch, said hydraulic mechanism comprising,
a first cylinder having a first cylinder piston, and
a second cylinder having a first second cylinder piston and a second second cylinder piston;

an automatic clutch operation unit having a motor being configured to drive said hydraulic mechanism in accordance with a prescribed signal input, said automatic clutch operating unit being configured to execute automatic engagement and disengagement of the clutch;

a manual clutch operating unit being configured to drive said hydraulic mechanism with a clutch pedal device, said manual clutch operating unit being configured to execute manual engagement and disengagement of said clutch, said hydraulic mechanism being configured to be driven alternatively by said automatic clutch operating unit and said manual clutch operating unit, said first cylinder piston being configured to be driven by said automatic clutch operating unit, said first second cylinder piston being configured to be driven by said first cylinder piston or said manual clutch operating unit to engage and disengage the clutch, and said second second cylinder piston being configured to be driven by said manual clutch operating unit; and a reservoir configured to store fluid from said hydraulic mechanism.

10. The clutch operating system according to claim 9, wherein said second cylinder further comprises a third second cylinder piston configured to be driven by said manual clutch operating unit.

11. The clutch operating system according to claim 10, wherein
said third second cylinder piston is disposed within said second second cylinder piston.

12. The clutch operating system according to claim 11, wherein
said third second cylinder piston is configured to open and close a valve disposed in a through-hole of said second second cylinder piston.

13. The clutch operating system according to claim 12, wherein
said valve comprises a check ball and a biasing member.

14. The clutch operating system according to claim 13, wherein said first and second cylinders and said reservoir comprise a plurality of ports and paths to facilitate hydraulic fluid flow.

15. The clutch operating system according to claim 14, wherein said second cylinder comprises, a first port configured to communicate between said first cylinder and a space between said first second cylinder piston and said second second cylinder piston, a second port configured to communicate with said reservoir, and a third port configured to communicate with the clutch pedal.

16. The clutch operating system according to claim 15, wherein said second second cylinder piston further comprises a first path configured to communicate between said space and said second port, such that said valve closes said oil path when hydraulic pressure is applied to said space and opens said first path when hydraulic pressure is applied to said third port from the clutch pedal.

* * * * *